United States Patent [19]

Giboulet et al.

[11] Patent Number: 4,477,691

[45] Date of Patent: Oct. 16, 1984

[54] HIGH TENSION METAL-CLAD INSTALLATION SUBDIVIDED INTO TIGHT COMPARTMENTS

[75] Inventors: André Giboulet, Saint-Egreve; Georges Henry, St. Martin-Le-Vinoux; Jean Kieffer, St. Martin D'Heres, all of France

[73] Assignee: Merlin Gerin, Grenoble, France

[21] Appl. No.: 466,909

[22] Filed: Feb. 16, 1983

[30] Foreign Application Priority Data

Feb. 19, 1982 [FR] France ............... 82 02910

[51] Int. Cl.³ ............................................. H02G 5/06
[52] U.S. Cl. ....................................... 174/22 C; 174/28
[58] Field of Search ............... 174/10, 21 C, 22 R, 174/22 C, 23, 28

[56] References Cited

U.S. PATENT DOCUMENTS 3,520,990 7/1970 Boersma ............... 174/23 R X
4,024,339 5/1977 Meyer et al. ............... 174/21 C Primary Examiner—Laramie E. Askin
Attorney, Agent, or Firm—Parkhurst & Oliff

[57] ABSTRACT

A metal-clad electric installation for high tension use includes a metallic housing containing a conductor supported by an insulator and surrounded by an insulating gas. The metallic housing has adjacent sections which are joined by pairs of connected flanges. The insulator has an external border which is interposed between the flanges of two successive sections of the housing and is secured thereto by bolts passing through aligned openings in the flanges and external border, thereby partitioning the housing into tight compartments. In order to dismantle a section without affecting the sealed condition of the adjacent section, the bolts are replaced by screws which are screwed into small nut plates inserted into slots provided in the interface of the external border and the flanges.

6 Claims, 4 Drawing Figures

HIGH TENSION METAL-CLAD INSTALLATION SUBDIVIDED INTO TIGHT COMPARTMENTS

BACKGROUND AND SUMMARY OF THE INVENTION

The invention relates to a metal-clad installation, especially for a high tension metal-clad substation, comprising a conductor placed inside a metallic housing containing an insulating gas and formed at least by one section connected to an adjacent section by a pair of connecting flanges with tightening bolts between which is interposed the external border of a supporting insulator of said conductor. The supporting insulator divides said housing into tight compartments.

In a metal-clad installation of the mentioned type, a fault of tightness for example can be limited at a given compartment, with the remaining part of the installation not being affected. The presence of connecting flanges permits a dismantling of the installation and an inspection or repair of some parts of the installation. When the flanges are dismantled, the tightness near the joint is broken and the two adjacent compartments obligatorily come into contact with the atmosphere. Before returning into service, the two compartments must be cleaned and filled with insulating gas even if the intervention is limited to one of the compartments. An increase in work and a complication of the inspection or repair operation result from this.

An object of the present invention is to remedy to this disadvantage and to permit the draining and dismantling of one of the installation compartments while maintaining the adjacent compartments in a tight condition under the normal working pressure.

According to the present invention the installation is characterized in that near the tightening bolts and in the interface between one of the flanges and the external border there is provided a slot. The slot is capable of receiving, after removing the bolt, a small plate nut in which a screw to fix the border to the other of the flanges can be screwed.

During a dismantling, a first connecting bolt is removed and a small plate nut receiving a screw to fix the opposite flange is slid in the corresponding slot on the side of the flange having to be dismantled. This secures the external border of the insulator to the non-dismantled flange of the section. Each bolt is successively replaced analogously by the just mentioned screw and small plate nut, the dismantling being, of course, carried out symmetrically to prevent excessive stresses on the insulator. After replacing all the bolts, the insulator is rigidly secured to the flange of the unaffected section and without any tightness break of this section. The fastening is sufficiently solid to withstand the differential pressure being exerted on the insulator when the defective section comes into contact with the atmosphere.

It is advantageous to provide slots on the two interfaces of the flange pair to permit a fastening of the insulator to any of the flanges and thereby a dismantling of any of the connecting sections. The slots can be provided in the insulator border when casting this border. Or, according to a variant of the invention, the slots can be machine-finished in the contact faces of the flanges.

The shape of the slots and small plate nuts is advantageously half crescent-shaped surrounding the bolt, so as to distribute the tightening forces and to limit the stresses exerted on the insulator border. The surface affected by the slots is only a fraction of the surface of the insulator border in contact with the flanges, so as to prevent any distortion of the insulator and to guarantee the tightness holding.

It is advantageous to provide a slot near each bolt, but the number of slots can be limited if the strength of fastening and the stresses imposed to the insulator are low.

BRIEF DESCRIPTION OF THE DRAWINGS

Other advantages and technical data will more clearly appear from the following description, wherein reference is made to the accompanying drawings, in which.

DETAILED DESCRIPTION OF THE PREFERRED EMBODIMENT

Figure 1:
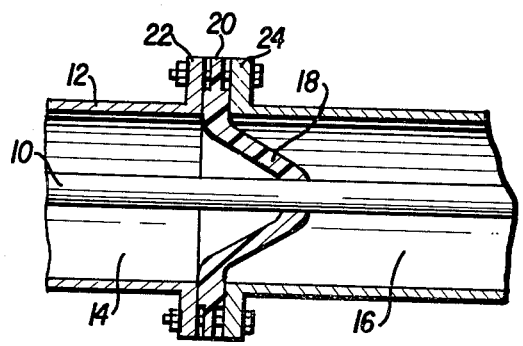
FIG. 1 is an axial sectional schematic view of a metal-clad conducting bar.

In FIG. 1 a metal-clad installation, under the circumstances a conducting bar 10, is concentrically disposed inside an earthed metallic sheath 12. The sheath 12 contains an insulating gas with high dielectric strength, especially sulfur hexafluoride under pressure, and the sheath inside is subdivided into several compartments 14, 16 by tight partitions formed by supporting insulators 18 of the conductor 10. The cone-shaped insulators 18 comprise an external border in the form of a ring 20 inserted between two flanges 22, 24 of a pair of connection flanges of two successive sheath sections. Tightening bolts 26 are circumferentially distributed to tighten the flanges 22, 24 in contact with the border 20, the tightness being ensured by O-ring gaskets 30.

Figure 2:
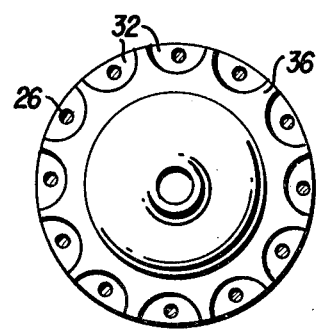
FIG. 2 is a side view on a magnified scale of the supporting insulator according to FIG. 1.
Figure 3:
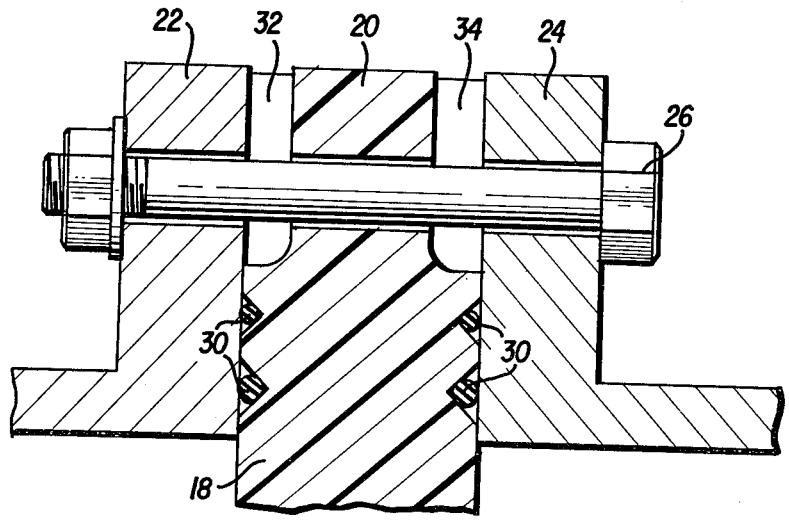
FIG. 3 is a partial view on a magnified scale of the connection flange of FIG. 1, shown in assembled position.
Figure 4:
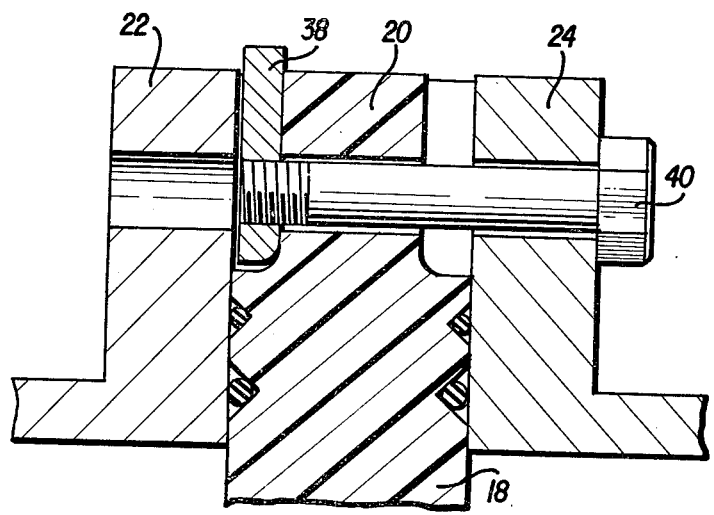
FIG. 4 is a view analogous to the one of FIG. 3, showing the supporting insulator connected to only one of the connection flanges.

Referring more particularly to FIGS. 3 and 4, slots 32, 34 are provided in the border 20 near the bolt 26 in the peripheral zones in contact with the flange 22 and the flange 24 respectively. The thickness of each slot 32, 34 is small relative to the thickness of the border 20, interposed between the flanges 22, 24. The slot 32, 34 extends only on the external periphery of the border 20 on a height which is a fraction of the border 20 height, interposed between the flanges 22, 24. Referring to FIG. 2, each slot is in the form of half crescent disposed around the bolt 26, the half crescents 32 not being joined to let full parts 36 of the border form spacing wedges of flanges 22, 24. Each slot 32, 34 is capable of receiving, after removing the bolt 26, a small plate nut 38 in the similar form of a half crescent, the thickness of which is slightly less than the thickness of the slot for making the setting easier. The small plate nut 38 presents a threaded port in which a screw 40 replacing the bolt 26 can be screwed. It is easy to see that a small plate nut 38, inserted in the slot 32, permits a fastening of the border 20 and thereby of the insulator 18 to the flange 24 by the screw 40. Accordingly, the flange 22 is released by removing the bolt 16 to permit a dismantling.

The invention is brought into play according to the following manner:

Under normal performance the sheath sections are tightly linked together by the bolts 26, the presence of slots 32, 34 not affecting the strength of this assembly. In case it should be necessary, washers of appropriate shape can be inserted into slots 32, 34 to limit any distortion risk. In the case of a dismantling, for example of the compartment 14 for an intervention or an inspection of elements located in this compartment, the bolts 26 which are removed one by one, are successively replaced by small plate nuts 38, inserted in the slots 32 adjacent to the flange 22 to be dismantled. Screws 40 to fasten the flange 24 onto the unaffected compartment 16 are screwed in the small plate nuts 38. After replacing all the bolts 26 by the screws 40-nuts 38, the border 20 is secured to the flange 24, the flange 22 being released. It is then possible to remove the sheath 12 of the corresponding section. The tightness of the compartment 16 is kept by fixing the insulator 18 to the flange 24, and this fastening realized by the screws 40 is sufficiently solid to withstand the pressure prevailing in the compartment 16 with the coefficient of proper security. In case it should be necessary, a temporary decrease of the pressure in the compartment 16 can be considered. The compartment, of course, will be put under pressure again in the same time as the compartment 14 after the repair and before putting into service the installation. The reassembling is inversely effected by replacing successively screws 40 by binding bolts 26.

According to the invention the fixing device does not require any insert in the insulator 18 capable of imposing a stress on the manufacturing or the use. Of course, the shape of the small plate nuts 38 can be different and the slot 32, 34 is not obligatorily located close to the flange insulator interface, but for example can be in the middle of the border thickness of the insulator when the thickness of the border is sufficient to withstand the imposed forces.

The invention is not at all limited to the embodiments described herein.

What is claimed is:

1. A metal-clad electric installation for a high tension metal-clad substation, comprising:
   a metallic housing containing an insulating gas and having at least one section connected to an adjacent section by a pair of connected flanges,
   a supporting insulator having an external border interposed between said connected flanges thereby partitioning said housing into tight compartments,
   aligned openings in said flanges and in said border, and connecting means passing through said openings for connecting said sections,
   an electrical conductor placed inside the metallic housing and supported by said insulator,
   at least a pair of slots provided in the interface of said external border and one of said flanges so that each slot surrounds one of said aligned openings,
   nuts shaped as a small plate for insertion into said slots,
   and screws for screwing into said nuts to fix the external border to the other of said flanges.

2. The metal-clad electric installation according to claim 1, having at least another pair of slots provided in the interface of the insulator border and the other of said flanges.

3. The metal-clad electric installation according to claim 2, wherein said slots are provided in the insulator border.

4. The metal-clad electric installation according to claim 2, wherein said slots are provided in the flanges.

5. The metal-clad electric installation according to claim 1, wherein said slots extend in the form of half crescents around said openings, said nuts having a similar form.

6. A metal-clad electric installation for a high tension metal-clad substation, comprising:
   a metallic housing containing an insulating gas and having at least one section connected to an adjacent section by a pair of connected flanges,
   a supporting insulator having an external border interposed between said connected flanges thereby partitioning said housing into tight compartments,
   aligned openings in said flanges and in said border, and connecting means passing through said openings for connecting said sections,
   an electrical conductor placed inside the metallic housing and supported by said insulator,
   at least a pair of slots provided in the middle of the border thickness so that each slot surrounds one of said aligned openings,
   nuts shaped as a small plate for insertion into said slots,
   and screws for screwing into said nuts to fix the external border to any one of said flanges.

* * * * *